US00RE45451E

(19) United States
(12) Reissued Patent
Sanno

(10) Patent Number: US RE45,451 E
(45) Date of Reissued Patent: Apr. 7, 2015

(54) IMAGE DISPLAY APPARATUS AND IMAGE DISPLAY METHOD

(71) Applicant: Canon Kabushiki Kaisha, Tokyo (JP)

(72) Inventor: Masato Sanno, Minato-ku (JP)

(73) Assignee: Canon Kabushiki Kaisha, Tokyo (JP)

(21) Appl. No.: 14/033,051

(22) Filed: Sep. 20, 2013

Related U.S. Patent Documents

Reissue of:
(64) Patent No.: 8,022,961
Issued: Sep. 20, 2011
Appl. No.: 12/906,854
Filed: Oct. 18, 2010

U.S. Applications:
(63) Continuation of application No. 11/537,022, filed on Sep. 29, 2006, now Pat. No. 7,839,412.

(30) Foreign Application Priority Data

Sep. 29, 2005 (JP) ..... 2005-284409
Sep. 13, 2006 (JP) ..... 2006-247761

(51) Int. Cl.
*G09G 5/00* (2006.01)
*G09G 5/34* (2006.01)

(52) U.S. Cl.
CPC ..... *G09G 5/346* (2013.01)

(58) Field of Classification Search
USPC ..... 345/581, 660–688; 382/293, 295, 382/298–99
See application file for complete search history.

(56) References Cited

U.S. PATENT DOCUMENTS

| | | | | |
|---|---|---|---|---|
| 5,519,485 | A * | 5/1996 | Ohtani et al. | 356/2 |
| 5,652,901 | A * | 7/1997 | Slayden et al. | 715/209 |
| 5,664,132 | A * | 9/1997 | Smith | 715/834 |
| 5,845,166 | A * | 12/1998 | Fellegara et al. | 396/429 |
| 5,973,734 | A * | 10/1999 | Anderson | 348/239 |
| 6,301,586 | B1 * | 10/2001 | Yang et al. | 1/1 |
| 6,396,500 | B1 * | 5/2002 | Qureshi et al. | 345/473 |
| 6,456,305 | B1 * | 9/2002 | Qureshi et al. | 715/800 |
| 6,545,687 | B2 * | 4/2003 | Scott et al. | 345/629 |
| 6,867,801 | B1 * | 3/2005 | Akasawa et al. | 348/222.1 |
| 6,964,025 | B2 * | 11/2005 | Angiulo et al. | 715/838 |
| 7,046,286 | B1 * | 5/2006 | Kobayashi et al. | 348/333.06 |
| 7,085,590 | B2 * | 8/2006 | Kennedy et al. | 455/556.1 |
| 2004/0174434 | A1 * | 9/2004 | Walker et al. | 348/211.3 |
| 2004/0239792 | A1 * | 12/2004 | Shibutani et al. | 348/333.12 |
| 2005/0052690 | A1 * | 3/2005 | Masumoto et al. | 358/1.15 |
| 2005/0134939 | A1 * | 6/2005 | Ikeda et al. | 358/471 |
| 2005/0174449 | A1 * | 8/2005 | Matsuzaka | 348/240.3 |

OTHER PUBLICATIONS

MyAlbum Version 2.3.1—Simple Image Cataloger and Slideshow, http://pmeindre.free.fr/MyAlbumSetup.exe (Internet Archive), retrieved Feb. 3, 2004.*

* cited by examiner

*Primary Examiner* — Xiao Wu
*Assistant Examiner* — Charles Tseng
(74) *Attorney, Agent, or Firm* — Canon USA Inc. IP Division

(57) ABSTRACT

The system control section 50 displays the entire original image as a display image, or scrolls a display image with a part of the original image being the display image, depending on relationship between the aspect ratios of the original image and the display area.

27 Claims, 12 Drawing Sheets

IMAGE DISPLAY APPARATUS AND IMAGE DISPLAY METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a *broadening reissue application of prior U.S. application Ser. No. 12/906,854 filed Oct. 18, 2010, now U.S. Pat. No. 8,022,961 issued Sep. 20, 2011, which is a* CONTINUATION of prior U.S. application No. 11/537,022 filed on Sep. 29, 2006 *now U.S. Pat. No. 7,839,412 issued Nov. 23, 2010,* which claims priority from Japanese Patent Application No. 2005-284409, filed Sep. 29, 2005, and Japanese Patent Application No. 2006-247761, filed Sep. 13, 2006, the disclosures of which are hereby incorporated by reference herein in their entirety.

BACKGROUND OF THE INVENTION

1. Field of the Invention

The present invention relates to an image display apparatus and an image display method for displaying a still image.

2. Description of the Related Art

In a case where the aspect ratio of an image to be displayed on an image display apparatus (hereinafter referred to as an "original image") is different from that of a display area of the image display apparatus, an image displayed on the display area (hereinafter referred to as a "display image") may be poorly viewed when an attempt is made to display the entire original image on the display area. This is because the original image needs to be resized in accordance with the size in either the vertical direction or the horizontal direction of the display area and the display image cannot be displayed on the entire display area.

If the entire original image is to be displayed when the value from ((the number of pixels in the horizontal direction)/(the number of pixels in the vertical direction)) of the original image is smaller than the value from ((the number of pixels in the horizontal direction)/(the number of pixels in the vertical direction)), the original image needs to be resized so that the vertical direction of the display image matches the vertical direction of the display area. As a result, a blank area appears at least either the left or right side of the display image.

Japanese Patent Laid-Open No. 3-46073 discloses a technique relating to the problem discussed above. Specifically, if a vertically oriented (i.e. vertically long) original image is displayed on a horizontally oriented (i.e. horizontally long) high-vision monitor, the original image is rotated 90 degrees (laid) and recorded in a frame memory. Then the vertically oriented portion of the image (16:9 vertical to horizontal) is cut out. Then the cut out image is rotated 90 degrees in the reverse direction (raised), transferred to a display memory and resized so that the size of the display image in the horizontal direction matches the size of the display area in the horizontal direction. As a result, the display image can be displayed in the entire display area: however, this alone does not allow a user to view the entire original image. Therefore, the process of sequentially shifting to the right or left an image area cut out from the frame memory is repeated so that the display image is scrolled in the vertical direction thereby the user can view the entire original image.

The method of Japanese Patent Laid-Open No. 3-46073 only takes account of the case where a vertically oriented original image is displayed on a high-vision monitor, i.e., where the value from ((the number of pixels in the horizontal direction)/(the number of pixels in the vertical direction)) of the original image is smaller than the value from ((the number of pixels in the horizontal direction)/(the number of pixels in the vertical direction)) of the display area. The method of Japanese Patent Laid-Open No. 3-46073 records the original image in a frame memory of the high-vision monitor in the size of 1920 pixels in the horizontal direction and 1035 pixels in the vertical direction. Thus, whether the original image is vertically oriented or horizontally oriented, easily-viewable display from original images with aspect ratios other than 16:9 horizontal to vertical (9:16 horizontal to vertical in the vertically oriented case) has not been considered. In addition, the method of Japanese Patent Laid-Open No. 3-46073 does not take account of intentionally displaying the entire original image on a display area even when the aspect ratio of the display area of the image display apparatus is different from the aspect ratio of the original image.

As the original image, however, may actually be vertically oriented or horizontally oriented and the aspect ratio varies, the method of Japanese Patent Laid-Open No. 3-46073 cannot generate an easily-viewable display image from such an original image. In addition, depending on a purpose of displaying an image, scrolling the display image may be undesirable even when the aspect ratio of the original image is different from that of the display area. The method of Japanese Patent Laid-Open No. 3-46073, however, cannot deal with such a case.

The present invention has been made in view of such circumstances, and provides a technique for generating a display image with high viewability to a user even from an original image with any aspect ratio. The invention also provides a technique for generating a display image taking account of the fact that an easily-viewable display image for a user may vary depending on a purpose of displaying the image.

SUMMARY OF THE INVENTION

It is a feature of the present invention to solve the conventional problems.

According to an aspect of the present invention, there is provided an image display apparatus for displaying an image on a predetermined display area, comprising:

a first calculation unit adapted to calculate a first magnification for matching the size of the image in a horizontal direction with the size of the display area in a horizontal direction;

a second calculation unit adapted to calculate a second magnification for matching the size of the image in the vertical direction with the size of the display area in the vertical direction;

a first resizing unit adapted to obtain a first resized image by resizing the image using a magnification equal to or larger than the other magnification of the first magnification and the second magnification; and a display control unit adapted to perform scrolling display on an area which cannot completely be contained in the display area in the first resized image.

According to another aspect of the present invention, there is provided an image display method for displaying an image on a predetermined display area, comprising:

a first calculation step of calculating a first magnification for matching the size of the image in the horizontal direction with the size of the display area in the horizontal direction;

a second calculation step of calculating a second magnification for matching the size of the image in the vertical direction with the size of the display area in the vertical direction;

a first resizing step of obtaining a first resized image by resizing the image using a magnification equal to or larger than the other magnification of the first magnification and the second magnification; and a display control step of performing scrolling display on an area which cannot completely be contained in the display area in the first resized image.

According to another aspect of the present invention, there is provided a computer program, stored in a computer-readable storage medium, for causing a computer to execute an image display method for displaying an image on a predetermined display area, the image display method comprising:

a first calculation step of calculating a first magnification for matching the size of the image in the horizontal direction with the size of the display area in the horizontal direction;

a second calculation step of calculating a second magnification for matching the size of the image in the vertical direction with the size of the display area in the vertical direction;

a first resizing step of obtaining a first resized image by resizing the image using a magnification equal to or larger than the other magnification of the first magnification and the second magnification; and a display control step of performing scrolling display on an area which cannot completely be contained in the display area in the first resized image.

According to another aspect of the present invention, there is provided an image display apparatus for displaying an image, comprising:

a determination unit adapted to determine whether or not to perform scrolling display on the image based on an operation state of the image display apparatus; and a display control unit adapted to control the scrolling display of the image depending on a result determined by the determination unit.

According to another aspect of the present invention, there is provided an image display method for displaying an image on an image display apparatus, comprising:

a determination step of determining whether or not to perform scrolling display on the image based on an operation state of the image display apparatus; and a display control step of controlling the scrolling display of the image depending on a result determined in the determination step.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments which facilitate the understanding of the superordinate concept, the middle concept and the subordinate concept of the present invention will be shown with reference to the attached drawings. All the concepts included in the embodiments below are not necessarily described in the following claims. It should be understood that they are not excluded from the technical range of the patent invention on purpose.

First Embodiment

<Configuration of a Digital Camera 100>

Figure 1:
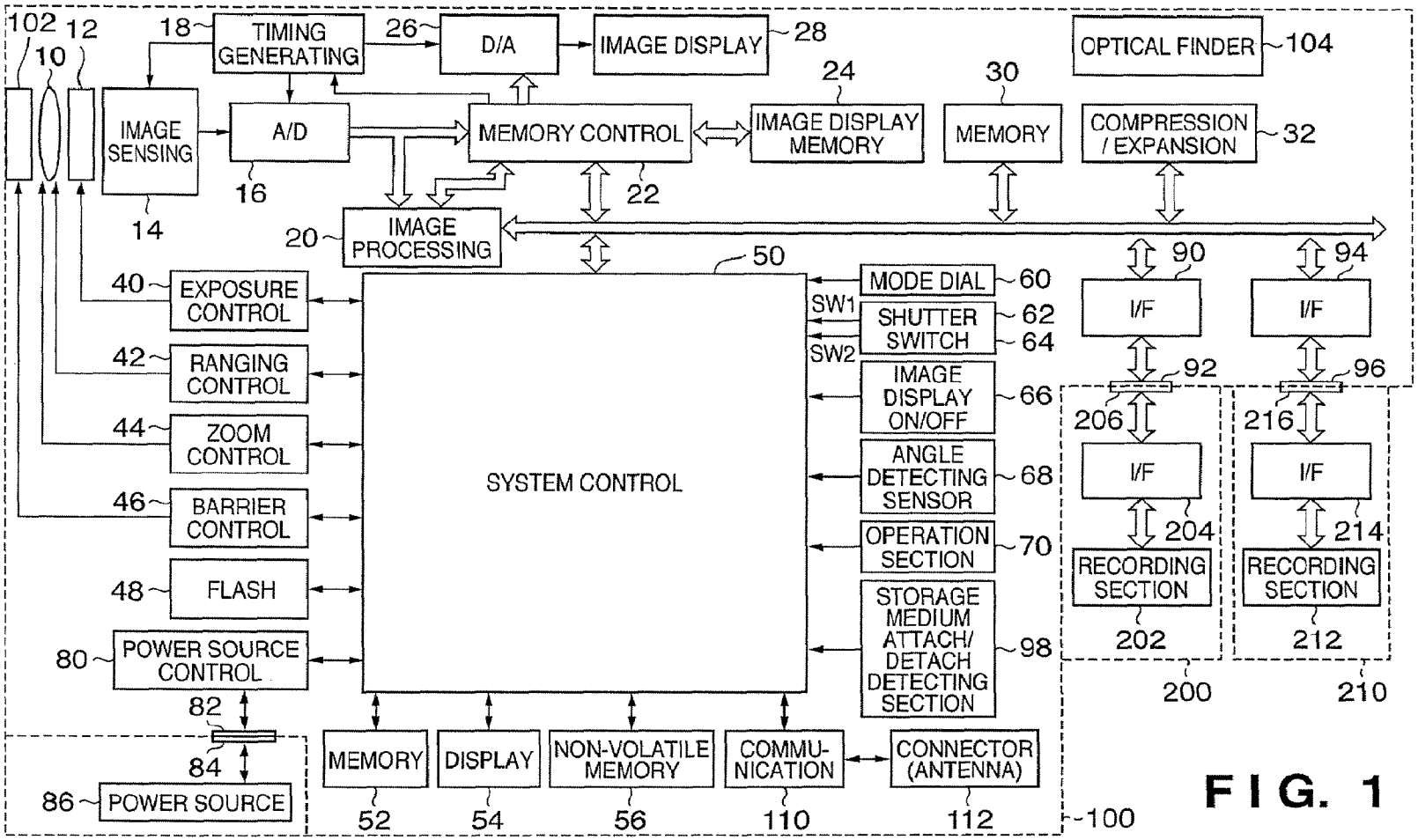
FIG. 1 is a functional block diagram showing a configuration of a digital camera which is an image display apparatus to which the present invention can be applied.

FIG. 1 is a block diagram showing a configuration of a digital camera 100, an image display apparatus to which the present invention can be applied. Although it is described that the present invention is applied to the digital camera 100 in the embodiment, the present invention can also be applied to an image display apparatus without an image pickup function such as a PC (personal computer). This is because features of the present invention reside in a technique for generating a display image in cases where the aspect ratio of the original image is different from the aspect ratio of the display area.

The digital camera 100 of the embodiment includes a digital camera which records digital image data in a digital recording medium (for example, a memory medium such as an EEPROM, a hard disk or the like). The digital camera may include a digital movie camera, a digital still camera or a complex machine of them.

The digital camera 100 is arranged to pick up an object image via an optical system 10 (an image pick up lens). The optical system 10 can be arranged with a zoom lens (a lens which can change an angle of view to be picked up). That provides an optical zoom function (so-called an optical zoom) to the digital camera 100.

The digital camera 100 can be arranged to have an electronic zoom function (so-called an electronic zoom) which is realized by electrically cutting (trimming) a picked up image with an image sensing device 14.

The digital camera 100 may be arranged to have only a function of either an optical zoom or an electronic zoom. The optical system 10 may be exchanged. In such a case, a zoom function may be realized by sending an electric signal from a zoom control section 44 of the digital camera 100 to the digital camera 100 thereby causing a drive mechanism in the optical system 10 to drive a resizing lens. Alternatively, a drive mechanism for mechanically driving the resizing lens in the optical system 10 may be provided in the digital camera 100.

A light beam from an object through the optical system 10 (light beam income within an optical angle of view) forms an optical image of the object on an image sensing surface of the image sensing device 14 through an aperture of a shutter 12 provided with an iris function. A CCD sensor or a CMOS sensor, for example, can be used for the image sensing device 14. The image sensing device 14 converts the optical image into an electric analog image signal and outputs the image.

An A/D converter 16 converts the analog image signal provided by the image sensing device 14 into a digital image signal.

The image sensing device 14 and the A/D converter 16 are controlled by a clock signal or a control signal provided by a timing generating circuit 18. The timing generating circuit 18 is controlled by a memory control section 22 and a system control section 50.

An image processing section 20 performs image processing such as pixel interpolating processing or color converting processing on image data (digital image signal) provided by the A/D converter 16 or image data provided by the memory control section 22. The image processing section 20 calculates data for AF (auto-focus) processing, AE (automatic exposure) processing, and EF (automatic dimming by flash pre-emission) in the TTL (through the lens) system based on image data picked up by the image sensing device 14. The image processing section 20 provides data obtained by the calculation for the system control section 50.

The system control section 50 realizes automatic exposure and an auto-focusing function by controlling an exposure control section 40 and a ranging control section 42 (AF control section) based on the data. Further, the image processing section 20 executes AWB (auto-white balance) processing in the TTL system based on the image data picked up by the image sensing device 14.

The memory control section 22 controls the A/D converter 16, the timing generating circuit 18, the image processing section 20, an image display memory 24, a D/A converter 26, a memory 30, a compression/expansion section 32.

Image data outputted from the A/D converter 16 is written into the image display memory 24 or the memory 30 via the image processing section 20 and the memory control section 22, or directly via the memory control section 22 without passing through the image processing section 20.

The display image data written in the image display memory 24 is converted into an analog display image signal by the D/A converter 26 and provided for the image display section 28. Accordingly, the picked up image is displayed on the image display section 28. An electronic view finder (EVF) function is realized by serially displaying picked up images on the image display section 28. The image display section 28 can be arbitrarily tuned ON/OFF for its display by an instruction from the system control section 50. Power consumption of the digital camera 100 can be reduced when it is used with the display turned OFF.

The memory 30 is used for storing a still image or a moving image picked up (as an image to be recorded in a storage medium). The capacity and the access rate (the writing rate, the reading rate) of the memory 30 may be arbitrarily designed. In order to enable continuous shooting, in which a plurality of still images are serially picked up, or panoramic shooting, the capacity and the access rate needs to be given in accordance with the respective purposes. The memory 30 can be used also as a working area for the system control section 50.

The compression/expansion section 32 is a circuit for compressing/expanding image data by an adaptive discrete cosine transform (ADCT) or the like. The compression/expansion section 32 is arranged to read image data stored in the memory 30, perform compression processing or expansion processing on the image data, and write the processed image data in the memory 30.

The exposure control section 40 controls a shutter 12 provided with the iris function based on information provided by the system control section 50. The exposure control section 40 may have a flash dimming function, which is in cooperation with a flash 48 (emission apparatus). The flash 48 has a flash dimming function and a floodlight function of an AF fill light.

The ranging control section 42 controls a focusing lens of the optical system 10 based on information provided by the system control section 50.

The zoom control section 44 controls zooming of the optical system 10.

A barrier control section 46 controls an operation of a barrier 102 which protects the optical system 10.

A flash 48 floodlights when an image is picked up in a dark place such as in the room or floodlights the AF fill light.

The system control section 50 controls over the entire digital camera 100.

A memory 52 stores constants, variables and a program for operating the system control section 50.A memory 52 also stores object data and the like for displaying an object on the image display section 28. Unlike the image data generated by image pick up, the object data is saved in a memory area different from the memory area for temporally saving image data. The object data is typically written in the memory 52 before shipment of the digital camera 100. The object data may also be rewritten by a user based on data downloaded through a telecommunication line or data contained in a storage medium and provided for the user after shipment of the digital camera 100. Furthermore, the object data may be rewritten at the service center or the like.

A display section 54 includes an LCD, an LED or the like. The display section 54 includes one or more devices and is arranged to output an operation state, a message or the like by character, image or the like according to execution of the program at the system control section 50. The display section 54 is placed in the appropriate place of the digital camera 100. Some display devices included in the display section 54 may be placed in an optical finder 104.

Information displayed on the LCD or the like among information displayed in the display section 54 includes a single-shot/continuous shooting image pick up display, a self-timer display, a compression ratio display, a number of recording pixels display, a number of recorded images display, a number of remaining recordable images display, a shutter speed display, and the like. In addition, it includes an iris value display, an exposure correction display, a flash display, a red eyes alleviating display, a macro image pick up display, a buzzer setting display, a remaining amount of clock battery display, a remaining amount of battery display, an error display, an information display by a plurality of digits, and the like. Further, it also includes an attaching/detaching state of storage media 200 and 210 display, an operation display for communication I/F 110, a date/time display and the like.

Information displayed in the optical finder 104 among information displayed in the display section 54 includes a focusing display, a camera shake warning display, a flash charging display, a shutter speed display, an iris value display, an exposure correction display and the like.

A non-volatile memory 56 is a memory which can be electrically erased and recorded such as an EEPROM or the like. The abovementioned object data may be stored in the non-volatile memory 56.

A mode dial 60 is a dial for setting (switching) a state of the digital camera 100 to an "image pick up mode", a "replaying mode", a "PC connecting mode", or the like.

A first shutter switch SW1 62 is turned ON during an operation (half press) of the shutter button (not shown) and instructs the system control section 50 to start AF processing, AE processing, AWB processing, EF processing and the like.

A second shutter switch SW2 64 is tuned ON when the shutter button (not shown) has been operated (fully pressed). The SW2 64 instructs the system control section 50 to start processing of reading out an image signal from the image sensing device 14, converting it into digital image data at the A/D converter 16, processing it at the image processing section 20, and then writing it in the memory 30 via the memory control section 22. The SW2 64 also instructs the system control section 50 to start a series of processes (image pick up processing) including processing of reading out image data from the memory 30, compressing it at the compression/expansion section 32, and writing the compressed image data in the storage medium 200 or 210.

An angle detecting sensor 68 detects a tilting angle of the digital camera 100. In short, the angle detecting sensor 68 detects whether the digital camera 100 is in a horizontal position or rotated to the left or right by 90 degrees.

An operation section 70 includes various buttons and a touch panel and the like, including a menu button, a set button, a macro button, a multi-screen replay new page button, a flash setting button, a single-shot/continuous shooting/self timer switching button and the like. The operation section 70 also includes a menu movement +(plus) button, a menu movement −(minus) button, a replay image movement +(plus) button, a replay image movement −(minus) button, a picked up image quality selection button, an exposure correction button, a date/time setting button and the like.

A power source control section 80 includes a power source detecting circuit, a DC-DC converter, a switch circuit for switching a block to be alive and the like. The power source control section 80 detects the presence of the power source, the type of power source, and the remaining amount of battery. According to the detected result and an instruction from the system control section 50, the power source control section 80 controls the DC-DC converter and supplies necessary voltage to each block in a necessary time period. The body of the digital camera 100 and the power source 86 have connectors 82 and 84 respectively and they are connected with each other by the connectors. The power source 86 is a primary battery such as an alkaline battery and a lithium battery and the like, a secondary battery such as a NiCd battery, NiMH battery, Li battery and the like, and an AC adapter and the like.

The storage media 200 and 210 are connected to connectors 92 and 96 of the body of the digital camera 100 by connectors 206 and 216. The storage media 200 and 210 includes recording sections 202 and 212 such as a semiconductor memory, a hard disk and the like, interfaces 204 and 214, for example, and connected to a bus in the digital camera 100 via the interfaces 90 and 94 of the digital camera 100. A storage medium attach/detach detecting section 98 detects whether the storage media 200 and 210 are connected to the connectors 92 and 96 or not.

Although it is described to have two lines of an interface and a connector for attaching a storage medium in this example, the digital camera 100 may have a single line or may have three or more lines. If it has a plurality of lines of an interface and a connector, they may have specifications different from each other. As an interface and a connector, those complying with specifications of a PCMCIA card or a CF (compact flash (registered trademark)) card or the like can be used.

If those complying with specifications of the PCMCIA card, the CF card or the like are adopted as interfaces 90 and 94 and connectors 92 and 96, they can transfer to exchange image data and management information attached to the image data with an external apparatus by using a card or like to be listed below. The card includes various communication cards such as a LAN card or a modem card, a USB card, an IEEE1394 card, a P1284 card, a SCSI card, a communication card such as a PHS and the like. For the external apparatus, a peripheral apparatus such as a computer, a printer or the like can be used.

The optical finder 104 enables image pick up without using an EVF function by the image display section 28. Inside the optical finder 104, a display device for forming a part of the display section 54, for example a display device for performing a focusing display, a camera shake warning display, a flash charging display, a shutter speed display, an iris value display, an exposure correction display and the like can be disposed.

The communication I/F 110 provides various communication functions such as a USB, an IEEE1394, a P1284, a SCSI, a modem, a LAN, a RS232C, a radio communication and the like. To the communication I/F 110, a connector 112 for connecting the digital camera 100 with another apparatus can be connected, or an antenna can be connected when a radio communication function is provided.

<Flow of Image Display Processing>

Figure 2:
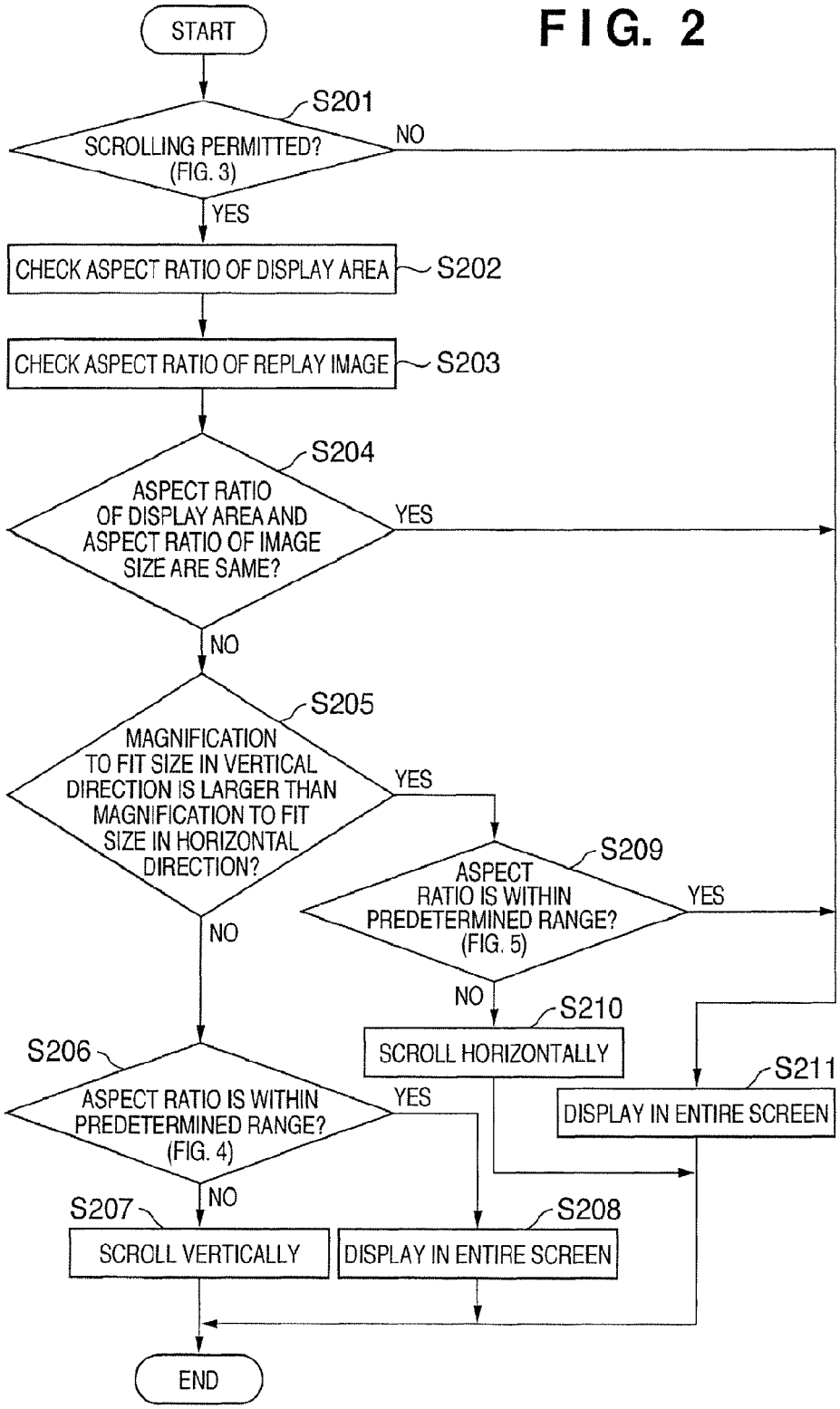
FIG. 2 is a flowchart showing a flow of processes for displaying an original image on a display area, i.e., an image display section.

FIG. 2 is a flowchart showing a flow of processes for displaying an original image on a display area, i.e., on an image display section 28. The processes in the flowchart may be executed in such cases listed below.

(1) The case where a user gives an instruction to display an image recorded in the storage medium 200 or 210 to the system control section 50 via the operation section 70. The image displayed in this case is called a "replay image", and the replay image becomes an original image, from which a display image is generated.

(2) The case where a user instructs the system control section 50 to pick up an image by operating a shutter button (not shown), and the system control section 50 displays a picked up image for checking on the image display section 28 for a predetermined several seconds instructed by the user (so-called a "REC review display function").

The two cases shown here are merely examples. To describe them in general, when the system control section 50 receives an instruction and displays an image on the image display section 28, the processing in the flowchart is executed.

The feature of the image display processing in the embodiment is that the system control section 50 selects an image display mode from the two display modes depending on the conditions to be detailed below. In the first display mode, the system control section 50 resizes an original image so that the entire original image is contained in the display area and displays the resized image. In the second display mode, the system control section 50 resizes an original image so that the size of the original image either in the horizontal direction or in the vertical direction matches the size of the display area and the size in the other direction becomes too large to be contained in the display area, and displays the resized image with scrolling the part which cannot completely be contained in the display area.

In the first display mode, the system control section 50 resizes the original image so that the sizes of the original image and the display area either in the horizontal direction or in the vertical direction match and the size in the other direction of the original image is equal to or less than the size of the display area.

In the second display mode, the system control section 50 resizes the original image so that the sizes of the original image and the display area either in the horizontal direction or in the vertical direction match. The direction is chosen so that the magnification of resize becomes larger.

It will be described in detail with reference to the flowchart of FIG. 2.

At the step S201, the system control section 50 determines whether scrolling of the display image is permitted or not. The detail of the determination will be described later with reference to FIG. 3. If the scrolling is permitted, the operation proceeds to the step S202. If the scrolling is not permitted, the operation proceeds to the step S211.

At the step S202, the system control section 50 checks an aspect ratio of the display area of the image display section 28. The aspect ratio of the display area is, for example, previously recorded in the non-volatile memory 56 though it is a designing matter of the digital camera 100. Here, angle information of the digital camera 100 obtained from the angle detection sensor 68 is used. Assume the case where if the angle information is 0 degrees (horizontal state), the aspect ratio of the display area is 4:3 horizontal to vertical. In this case, the aspect ratio of the display area is 3:4 horizontal to vertical if the angle information is 90 degrees (vertical state). As it is not general to view an image obliquely, angle information other than 0 degrees and 90 degrees is preferably approximated to the nearer one of them. As 180 degrees means a horizontal state as a result, and 270 degrees means a vertical state, they are preferably considered as 0 degrees and 90 degrees respectively.

At the step S203, the system control section 50 checks the aspect ratio of the image to be displayed, i.e., the original image. The aspect ratio of the original image can be checked because the number of pixels of the original image is obtained from a header area of an image file including the original image. If a REC review is performed on an image immediately after picked up as an original image, the aspect ratio can be directly obtained from setting information of the digital camera 100.

At the step S204, the system control section 50 determines whether the aspect ratio of the display area and the aspect ratio of the original image match or not. As the original image can be displayed on the entire display area without necessity of scrolling if the aspect ratios match, the operation proceeds to the step S211. If the aspect ratios do not match, the operation proceeds to the step S205.

At the step S205, the system control section 50 calculates a magnification where the original image is resized so that the size of the original image in the horizontal direction matches the size of the display area in the horizontal direction, and a magnification where the original image is resized so that the size of the original image in the vertical direction matches the size of the display area in the vertical direction. Next, the system control section 50 compares the calculated two magnifications. If the latter magnification is larger, the operation proceeds to the step S209; and if the former magnification is larger, the operation proceeds to the step S206.

Comparison of the aspect ratios at the step S204 can also be performed by comparison of two magnifications. That is to say, if two magnifications match, the aspect ratios also match.

Here, if the original image is 1600 pixels in horizontal×900 pixels in vertical and if the display area is 320 pixels in horizontal×240 pixels in vertical and the original image is resized with the horizontal direction of the display area being as basis, the magnification is 1/5, and if the original image is resized with the vertical direction being as basis, the magnification is 4/15. Therefore, the operation proceeds to the step S209 in the example.

At the step S206, the system control section 50 determines whether a difference between the aspect ratio of the display area and the aspect ratio of the original image is within a predetermined range or not. The details of the determination will be described later with reference to FIG. 4. If the difference is within the predetermined range, the operation proceeds to the step S208; and if the difference is not within the predetermined range, the operation proceeds to the step S207.

At the step S207, the system control section 50 generates a resized image which is an original image resized so that the size of the original image in the horizontal direction matches the size of the display area in the horizontal direction, and stores the resized image in the memory 30. Next, the system control section 50 realizes scrolling display of the resized image in the vertical direction by cutting out portions in the same size as that of the display area from the resized image recorded in the memory 30 and transferring them to the image display memory 24 from the top or from the bottom in order. The scrolling display will be described later with reference to FIG. 7A to FIG. 7D.

At the step S208, the system control section 50 resizes the original image so that the size of the original image in the vertical direction matches the size of the display area in the vertical direction and displays the entire original image in the display area. This is because if a difference of aspect ratios determined at the step S206 is within a predetermined range and the entire original image is displayed in the display area, the display image becomes relatively large. It is a mater of course that the digital camera 100 may be arranged to perform scrolling display in the vertical direction at the step S207 without performing determination at the step S206.

At the step S209, the system control section 50 determines whether a difference between the aspect ratio of the display area and the aspect ratio of the original image is within a predetermined range or not. The details of the determination will be described later with reference to FIG. 5. If it is within the predetermined range, the operation proceeds to the step S211, and if it is not within the predetermined range, the operation proceeds to the step S210.

At the step S210, the system control section 50 generates a resized image which is an original image resized so that the size of the original image in the vertical direction matches the size of the display area in the vertical direction and stores the resized image in the memory 30. Next, the system control section 50 realizes scrolling display of the resized image in the horizontal direction by cutting out portions in the same size as that of the display area from the resized image recorded in the memory 30 and transferring them to the image display memory 24 from the left or from the right in order. The scrolling display will be described later with reference to FIG. 8A to FIG. 8D.

The processing at the step S211 differs depending on the step from which the operation reached the step S211.

If the operation reached from the step S201, the system control section 50 generates a resized image which is an original image resized so that the sizes of the original image and the display image either in the horizontal direction or in the vertical direction match and the size in the other direction of the original image is equal to or less than the size of the display area, and record it in the memory 30. Next, the system control section 50 transfers the resized image to the image display memory 24 and displays the entire original image in the display area.

If the operation reached from the step S204, the system control section 50 performs the same processing as in the case where the operation reached from the step S201, but the original image can be resized with either the vertical direction or the horizontal direction as basis. This is because the aspect ratios of the original image and the display area match.

If the operation reached from the step S209, the system control section 50 resizes the original image so that the size of the original image in the horizontal direction matches the size of the display area in the horizontal direction, and displays the entire original image in the display area. This is because if the difference between the aspect ratios determined at the step S209 is within a predetermined range and the entire original image is displayed in the display area, the display image becomes relatively large. It is a matter of course that the digital camera 100 may be arranged to perform scrolling display in the horizontal direction at the step S210 without performing determination at the step S209.

During the scrolling display at the step S207 or S210, the digital camera 100 may be instructed to transit to another operation state. In this case, the digital camera 100 desirably stops the scrolling display and transits to the other state. This is because if the scrolling display is not stopped, the transition to the other state cannot be executed until the scrolling display is finished, which consequently hampers smooth transition between operation states. Instructions to transit to another state include, for example, a transition instruction to another mode made by the mode dial 60 which is manipulated, a display instruction of another screen such as a menu screen or an image forwarding instruction, both made by the operation section 70 which is manipulated, and a shooting instruction during the REC review display (described later).

<Flow of Scroll Permission Determination Processing>

Figure 3:
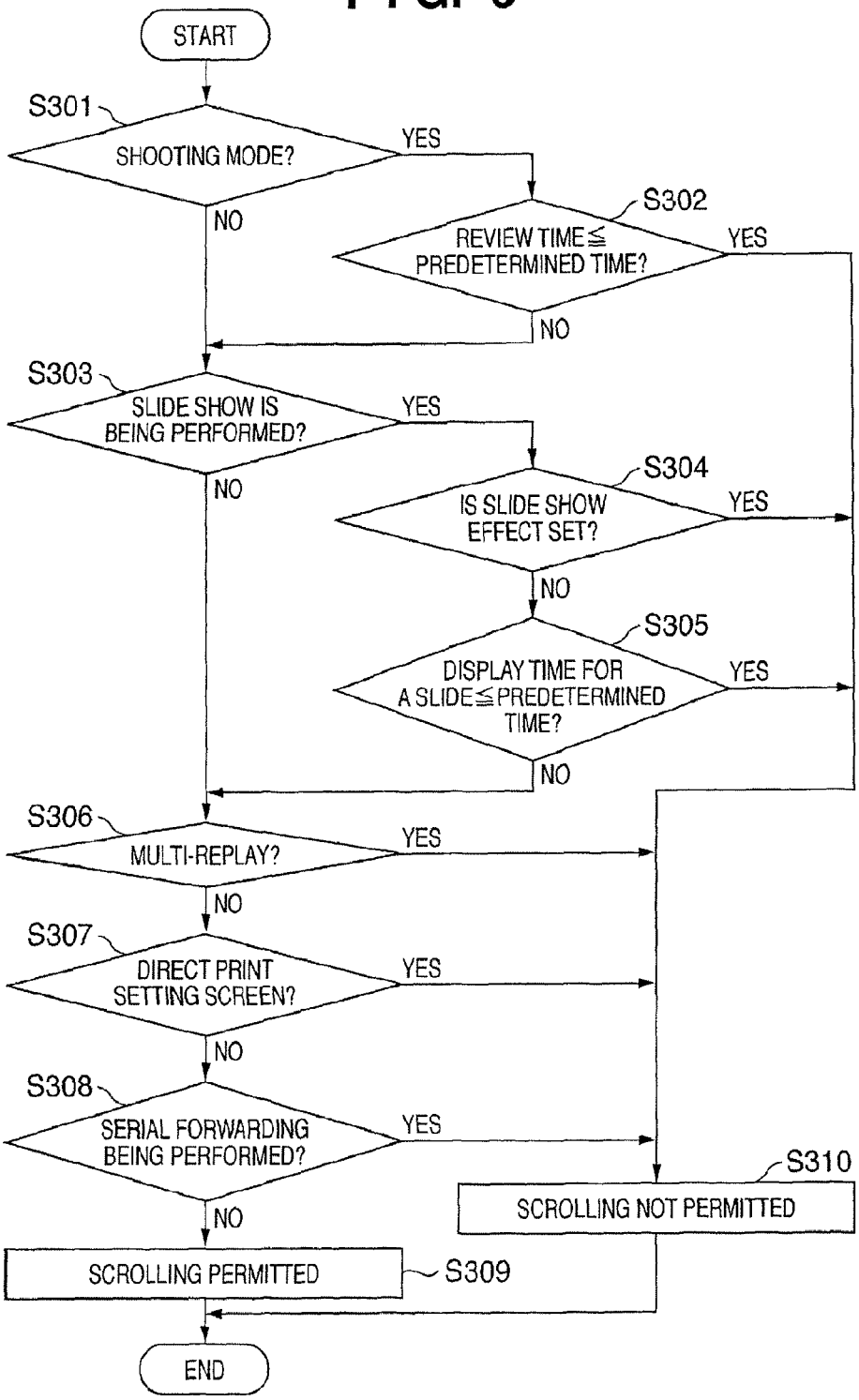
FIG. 3 is a flowchart showing a flow of processes for determining whether scrolling of the display image is permitted or not at the step S201 of FIG. 2.

FIG. 3 is a flowchart showing a flow of processes for determining whether scrolling of the display image is permitted or not at the step S201 of FIG. 2.

At the step S301, the system control section 50 determines whether a mode dial 60 of the digital camera 100 is set for a shooting mode or not. If it is set for the shooting mode, the operation proceeds to the step S302; if otherwise, proceeds to the step S303.

At the step S302, the system control section 50 determines whether a display time of the REC review is within a predetermined time or not. A situation in which an image is displayed in the shooting mode occurs when a picked up image is displayed for checking immediately after the image is picked up (REC review). If a display time of the REC review is within a predetermined time, the operation proceeds to the step S310, and the system control section 50 does not permit the scrolling display. This is because if the scrolling display is permitted, a case where scrolling does not end within a display time of the REC review may occur. If the scrolling display is made to end within a short display time of REC review, the scrolling becomes fast, thus, the review image becomes uneasy to be viewed. The display time for the REC review can be set by a user operating the operation section 70 or the like. The digital camera 100 may be arranged to allow a user to select a predetermined time for determining whether the scrolling of the review image is to be permitted or not, or to use a unique stipulated value of the digital camera 100. If the display time of the REC review is longer than a predetermined time at the step S302, the operation proceeds to the step S303.

The digital camera 100 is preferably arranged to stop the scrolling display and perform the next image pick up, if the scrolling of the review image in a shooting mode is permitted and a user instructs to shoot the next image when a REC review involving the scrolling is being displayed.

The digital camera 100 may be arranged to avoid the scrolling display whenever in the REC review, because in the image display for the REC review, the scroll, if allowed, is time consuming and disturbing. This can be achieved by proceeding to the step S310 whenever it is determined that the mode dial is set for a recording mode at the step S301.

At the step S303, the system control section 50 determines whether the digital camera 100 performs automatic serial display (slide show) of images or not. If it performs the slide show, the operation proceeds to the step S304; and if it does not perform the slide show, the operation proceeds to the step S306.

At the step S304, the system control section 50 determines whether an effect setting is performed on the slide show or not. If the effect setting is performed on the slide show, the operation proceeds to the step S310, and the system control section 50 does not permit the scrolling display. This is because a special effect such as fade-in or fade-out of the replay image may be added to the slide show effects, and as a result, the special effect and the scrolling display of the replay image are performed at the same time and the display image may become too much complicated to be viewed. If the effect setting is not performed on the slide show, the operation proceeds to the step S305.

At the step S305, the system control section 50 determines whether a display time for a slide of the slide show is within a predetermined time or not. If it is within the predetermined time, the operation proceeds to the step S310 and the system control section 50 does not permit scrolling display. This is because if the scrolling is permitted when a display time for a single slide of the slide show is too short, a case where the scrolling does not end within a display time for a single slide of the slide show may occur. If a display time for a single slide of the slide show is short and the scrolling display is made to end within the display time, the scrolling becomes fast, thus, it become poorly viewed. If a display time for a single slide of the slide show exceeds a predetermined time, the operation proceeds to the step S306. The display time for a single slide for the slide show can be set by a user as the user operates the operation section 70 or the like. The digital camera may be arranged to allow a user to set a predetermined time for determining whether the scrolling is to be permitted in the slide show or not, or to use a particular preset value.

The digital camera 100 is preferably arranged to display the next replay image (an object of a replay instruction) even in the scrolling display if the system control section 50 receives an image forwarding instruction from the operation section 70 during a slide show.

At the step S306, the system control section 50 determines whether a display of the replay image is multi-replay (thumbnail display) or not. The multi-replay is to display a plurality of images in a screen. An example of that will be shown in FIG. 12A. If the display is in multi-replay, the operation proceeds to the step S310, and the system control section 50 does not permit the scrolling display. This is because if the display is in multi-replay, it may be a case where a user wants to find one or more images from a plurality of images instead of viewing details of an image, thus, an image is easily found if each image is entirely displayed instead of an image being displayed as scrolled. If the display of the replay image is not in the multi-replay, the operation proceeds to the step S307.

At the step S307, the system control section 50 determines whether the display of the replay image is in a direct print setting screen or not. If it is in the direct print setting screen, the operation proceeds to the step S310, and the system control section 50 does not permit the scrolling display. The digital camera 100 can perform direct print which causes a printer to print an image in a storage medium 200 or 210 by connecting the communication I/F 110 to the printer via a USB or a wireless LAN and the like. Here, the user needs to select an image to be printed. In such a case, it is highly possible that the user wants to check a printing range for an objective image or the like, and the scrolling display is inconvenient for the user to check the printing range. Therefore, if display of the replay image is in a direct print setting image, scrolling display is not permitted. As with the case where an image to be printed is selected in the direct print setting screen, operations to select a desired image from a plurality of images include selection of an image to be transferred, selection of an image to be deleted, selection of an image to be protected, and selection of images to be displayed in the slide show. The display associated with these operations is not intended for an appreciation of an image, but for identification of an image. Therefore, it may be considered that the scrolling display performed every time is disturbing due to the scroll which takes time. Accordingly, in addition to the direct print setting screen, the digital camera 100 may be arranged to disable the scrolling display in such a display for selecting a desired image from a plurality of images. If the display of the replay image is not in the direct print setting screen, the operation proceeds to the step S308.

At the step S308, the system control section 50 determines whether a serial forwarding of replay images is being performed or not. If it is being executed, the operation proceeds to the step S310, and the system control section 50 does not permit the scrolling display. This is because if a serial forwarding of replay images is performed, it is considered that a user generally wants to view replay images as many as possible in a short time, thus, the scrolling display which takes much time in displaying a replay image is not preferable. The serial forwarding of the replay image is to switch images to be replayed one after another in a short time as a user operates the operating section 70. There are two methods for switching images to be replayed one after another in a short time; a method of keeping an image forwarding button on the operation section 70 pressed and a method of repeating operations of pressing and releasing the image forwarding buttons in a short time interval. The system control section 50 may determine whether the serial forwarding of replay images is performed or not for both of the methods, or for either of the methods. In determining whether a serial forwarding is being performed by the method of repeating operations of pressing and releasing the image forwarding buttons in a short time interval, if an average of intervals between pressing operations on an image forwarding button for the past specified number is within a predetermined time, it is determined that serial forwarding is being performed. If the serial forwarding of replay images is not being performed, the operation proceeds to the step S309.

At the step S309, the system control section 50 permits the scrolling display. This is because as a result of determinations at the steps S301 to S308, it is considered that replay images are forwarded one by one at a relatively long interval. The digital camera 100 is preferably arranged to stop the scrolling display and display the next replay image (which is an object of a replay instruction), if the system control section 50 receives an instruction of image forwarding during the scrolling display.

The digital camera 100 may be arranged not to permit the scrolling display if replay images which are once displayed as scrolled are to be displayed again even in the case where replay images are forwarded one by one at a relatively long interval. This is for preventing troublesome in that the same images are displayed as scrolled again and again. Information on whether the replay images have already been displayed as scrolled or not may be recorded in the header area in an image file which includes the replay images or in the memory 30.

<Flow of Difference Degree between Aspect Ratios Determination Processing>

Figure 4:
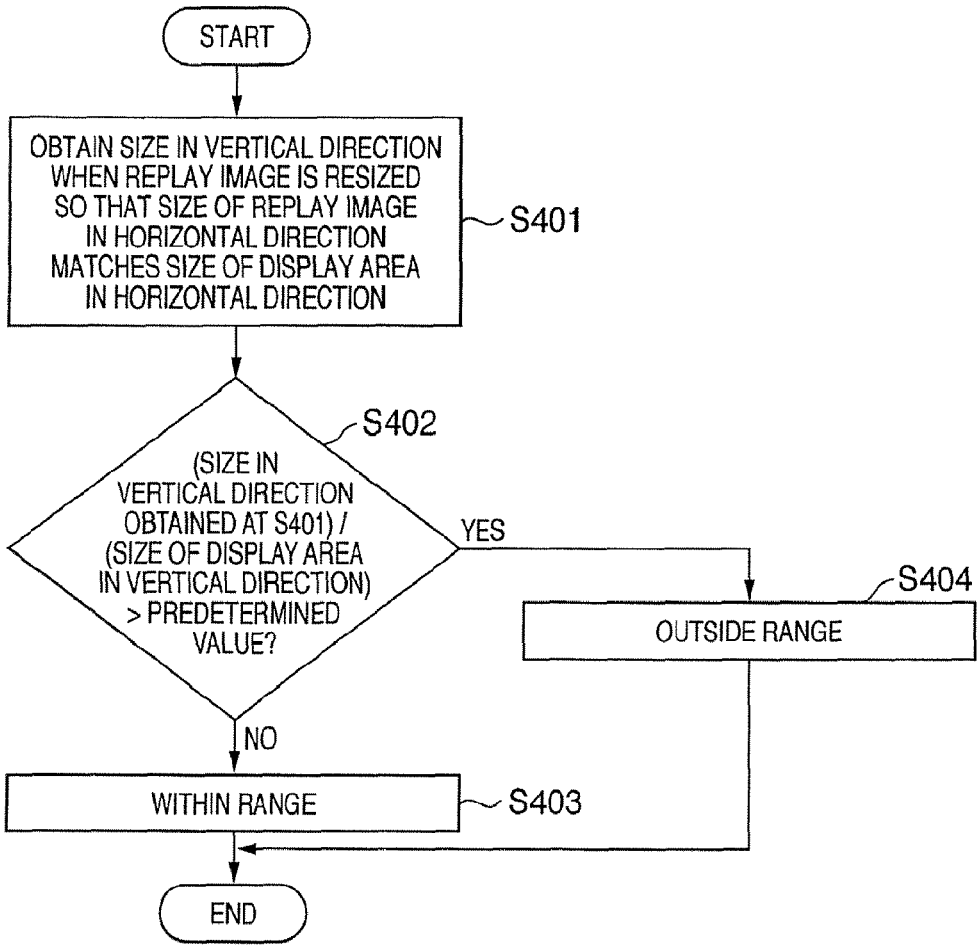
FIG. 4 is a flowchart showing a flow of processes for determining whether a difference between the aspect ratio of the display area and the aspect ratio of the original image is within a predetermined range or not at the step S206 of FIG. 2.

FIG. 4 is a flowchart showing a flow of processes for determining whether a difference between the aspect ratio of the display area and the aspect ratio of the original image is within a predetermined range or not at the step S206 of FIG. 2.

At the step S401, the system control section 50 obtains the size of the replay image in the vertical direction when the replay image is resized so that the size of the replay image in the horizontal direction matches the size of the display area in the horizontal direction.

At the step S402, the system control section 50 determines whether the value from ((the size in the vertical direction obtained at the step S401)/(the size of the display area in the vertical direction)) is larger than a predetermined value or not. If it is larger than the predetermined value, the operation proceeds to the step S404, and the system control section 50 determines that "the aspect ratio is outside the predetermined range". If it is not larger than the predetermined value, the operation proceeds to the step S403, and the system control section 50 determines that "the aspect ratio is within the predetermined range".

The predetermined value can be previously recorded in the non-volatile memory 56 or the like. The larger the value, the more the scrolling display of the replay image is restricted; however, it becomes more possible that viewability decreases due to the small display image.

Figure 5:
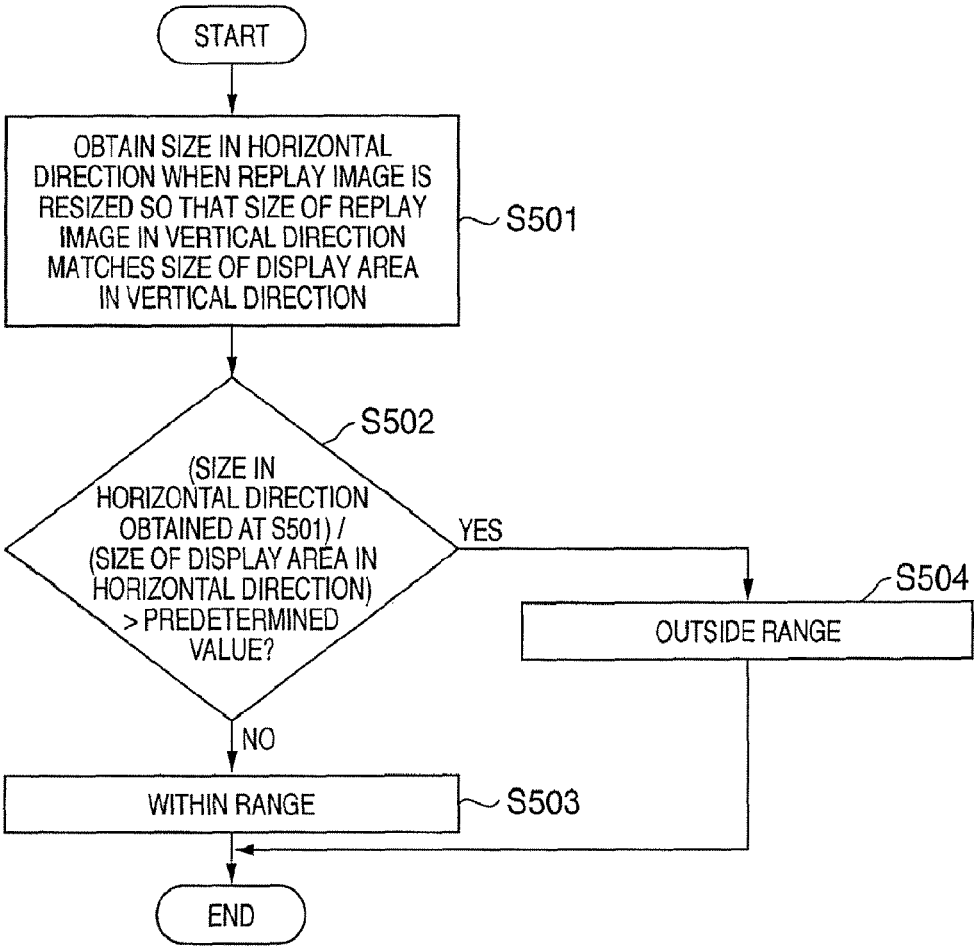
FIG. 5 is a flowchart showing a flow of processes for determining whether a difference between the aspect ratio of the display area and the aspect ratio of the original image is within a predetermined range or not at the step S209 of FIG. 2.

FIG. 5 is a flowchart showing a flow of processes for determining whether a difference between the aspect ratio of the display area and the aspect ratio of the original image is within a predetermined range at the step S209 of FIG. 2.

At the step S501, the system control section 50 obtains the size of the replay image in the horizontal direction when the replay image is resized so that the size of the replay image in the vertical direction matches the size of the display area in the vertical direction.

At the step S502, the system control section 50 determines whether the value from ((the size in the horizontal direction obtained at the step S501)/(the size of the display area in the horizontal direction)) is larger than a predetermined value or not. If it is larger than the predetermined value, the operation proceeds to the step S504, and the system control section 50 determines that "the aspect ratio is outside the predetermined range". If it is not larger than the predetermined value, the operation proceeds to the step S503, and the system control section 50 determines that "the aspect ratio is within the predetermined range".

The predetermined value can be previously recorded in the non-volatile memory 56, for example as at the step S402. The larger the value, the more the scrolling display of the replay image is restricted; however, it becomes more possible that viewability decreases due to the small display image. The predetermined value at the step S402 and the predetermined value at the step S502 are not necessarily the same.

<Image Display Example>

Figure 6A:
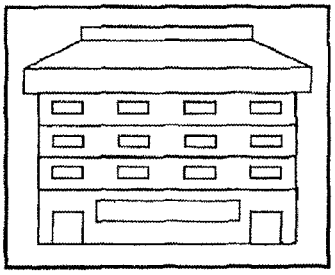
FIGS. 6A to 6C are diagrams showing examples of a display image when the entire original image is displayed in the display area.
Figure 6B:
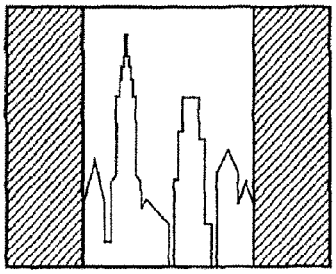
Figure 6C:
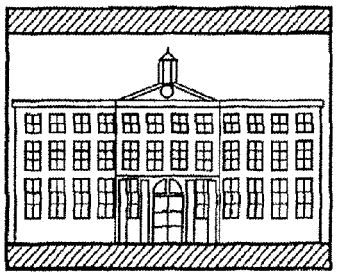

FIGS. 6A to 6C are diagrams showing examples of a display image when the entire original image is displayed in the display area.

FIG. 6A is an example of a display image when the operation reached from the step S204 to S211. As the aspect ratio of the original image and the aspect ratio of the display area match, the entire original image is fully displayed in the entire display area.

FIG. 6B is an example of the display image at the step S208. Although there are blank parts at the left side and the right side of the display image, the display image is relatively large and viewable.

FIG. 6C is an example of the display image when the operation reached from the step S209 to the step S211. Although there are blank parts at the top and the bottom of the display image, the display image is relatively large and viewable.

If the operation reached from the step S201 to the step S211 where the aspect ratio of the original image and the aspect ratio of the display area do not match, the display image becomes that shown in FIG. 6B or 6C. In such a case, the display image may be small and not viewable depending on the degree of a difference between aspect ratios.

Although the display image is placed in the center of the display area in FIG. 6B and FIG. 6C, it is not necessarily placed in the center, and the display image may be placed at the left side of the display area instead of, for example, in the case of FIG. 6B.

Figure 7A:
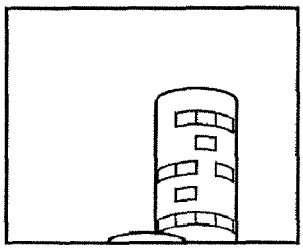
FIGS. 7A to 7D are diagrams showing examples where a display image is scrolled vertically and displayed at the step S207.
Figure 7B:
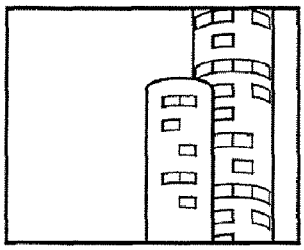
Figure 7C:
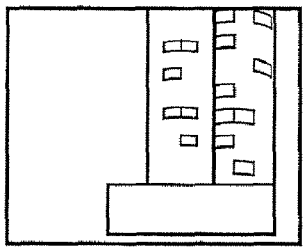

FIGS. 7A to 7D are diagrams showing examples where a display image is displayed as vertically scrolled at the step S207. If the entire original image is to be displayed in the display area, it is shown as in FIG. 7D; however, the display image becomes small so that a part of the original image is displayed as scrolled from the top to the bottom as the display image as shown in FIGS. 7A to 7C. At the step S207, the scrolling of the display image is automatically performed by control of the system control section 50. Because it is determined that at the step S207 performing the scrolling display is preferable as a result of various determinations, it is highly possible that the scrolling display is desirably performed for a user. Therefore, the automatic scrolling display reduces burden for the user.

Figure 7D:
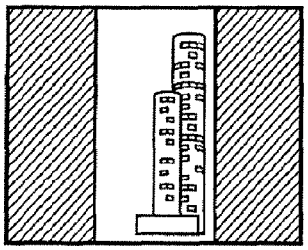

Although the scrolling of the display images is made to be automatically performed, it may be performed manually by the system control section 50 receiving a scrolling instruction from a user via the operation section 70. The display image may be scrolled from the bottom to the top instead of from the top to the bottom. After the scrolling ends, the entire original image is preferably displayed in the display area as shown in FIG. 7D. The digital camera 100 may be arranged to perform the scrolling display automatically at first and manually in response to a user's instruction after the automatic scrolling display completed. The digital camera 100 may be arranged to display the entire original image in the display area at first as shown in FIG. 7D and starts the scrolling display in response to a user's instruction via the operation section 70. Alternatively, although the display image is displayed in the entire display area at first as shown in FIG. 7A, for example, the scrolling may be started in response to a user's instruction via the operation section 70 instead of performing the scrolling.

Figure 8A:
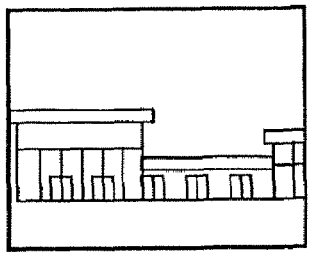
FIGS. 8A to 8D are diagrams showing examples where a display image is scrolled horizontally and displayed at the step S210.
Figure 8A:
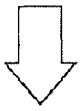
Figure 8B:
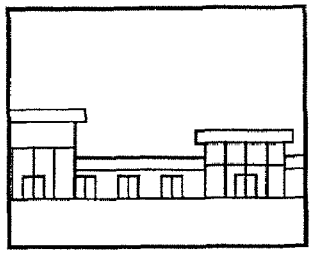
Figure 8B:
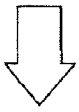
Figure 8C:
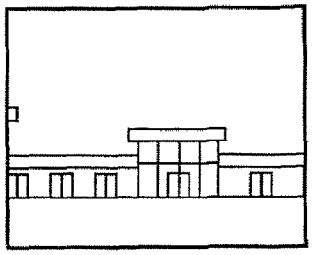
Figure 8C:
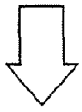

FIGS. 8A to 8D are diagrams showing examples where a display image is horizontally scrolled at the step S210. If the entire original image is to be displayed in the display area, it will be shown as in FIG. 8D; however, as the display image becomes small, thus, a part of the original image is displayed as scrolled from the left to the right as the display image as shown in FIGS. 8A to 8C.

Figure 8D:
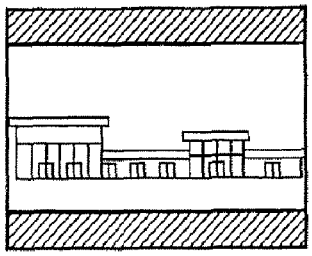

That the display image is automatically scrolled, that it may be manually performed, that it can be scrolled from the right to the left, and that the entire original image is displayed in the display area as shown in FIG. 8D after the scrolling ends are the same as those described in the FIGS. 7A to 7D.

Figure 9:
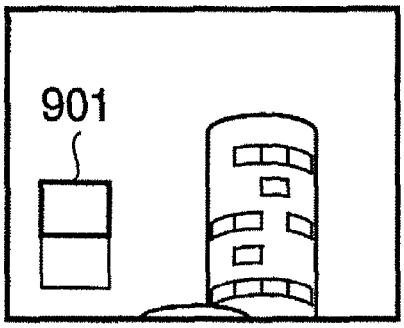
FIG. 9 is a diagram showing an example of a guidance display relating to a scrolling display.

A guidance display may be performed when an image display involving the scrolling is performed. FIG. 9 is an example of a screen display before the scrolling. Reference numeral 901 denotes an area of the entire image displayed on a screen in a bold line.

Figure 10:
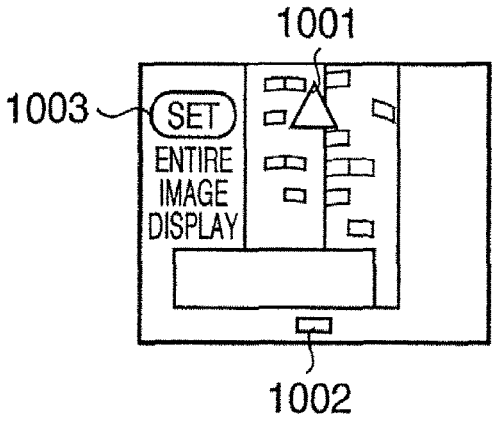
FIG. 10 is a diagram showing an example of a guidance display relating to a scrolling display.

FIG. 10 is an example of a screen display before the display image is scrolled. Reference numeral 1001 denotes that it can be scrolled to the top and reference numeral 1002 denotes that it cannot be scrolled to the bottom. Reference numeral 1003 shows that the entire display image is displayed when a SET button included in the operation section 70 is pressed.

Figure 11:
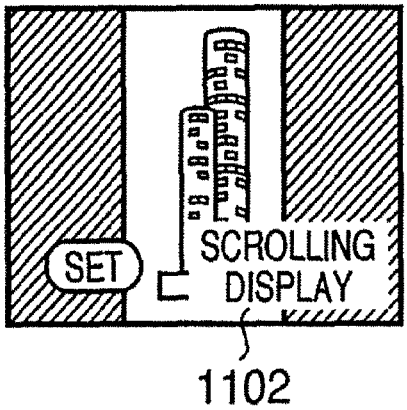
FIG. 11 is a diagram showing an example of a guidance display relating to a scrolling display.

FIG. 11 is an example of a screen display when the entire display image is displayed in the entire screen. Reference numeral 1101 shows that it is displayed as scrolled when a SET button included in the operation section 70 is pressed.

<Thumbnail Display and Display of a Selected Image>

The digital camera 100 may have a thumbnail display function for multi-displaying thumbnails of a plurality of images in the display area. Although it is described that the scrolling display is not permitted during multi-replaying in FIG. 3, the digital camera 100 can be arranged to perform the scrolling display when it performs multi-display. FIGS. 12A to 12E are diagrams showing examples where a selected image is displayed as scrolled when the particular image is selected in a thumbnail display screen, which is multi-display.

Figure 12A:
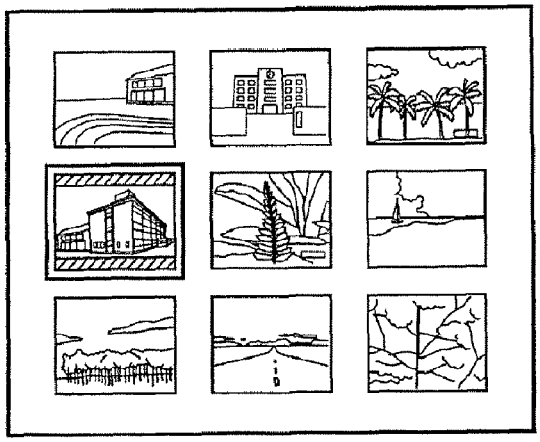
FIGS. 12A to 12E are diagrams showing examples where a selected image is displayed with being scrolled when the particular image is selected in a thumbnail display screen.
Figure 12B:
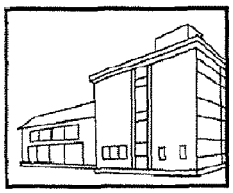
Figure 12C:
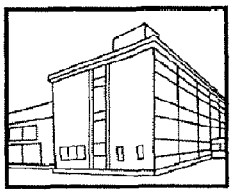
Figure 12D:
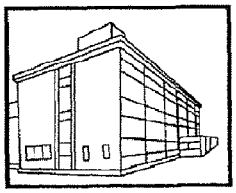

FIG. 12A shows an example of thumbnail display screen. In the thumbnail display screen, a user can select an image by operating the operation section 70. In FIG. 12A, an image contained in the double frames is selected. If the system control section 50 receives a decision instruction from the operation section 70 in this state, the selected image is displayed in the display area according to the flowchart of FIG. 2. The selected image is displayed as scrolled in the horizontal direction, for example as shown in FIGS. 12B to 12D. It is a matter of course that the selected entire image is displayed in the display area when the aspect ratio of the selected image and the aspect ratio of the display area match.

Figure 12E:
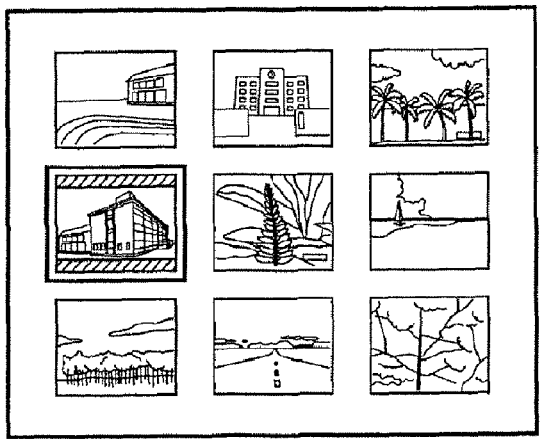

When the scrolling display ends, the screen returns to the original thumbnail display screen as shown in FIG. 12E.

<Image Selection in Direct Print>

As mentioned above, the digital camera 100 may have a direct print function for printing an image in the storage medium 200 or 210 by connecting with the printer via the USB or the wireless LAN. In such a case, an image to be printed needs to be selected. The image display in the embodiments described above may be applied to image selection in direct print.

When a user performs image forwarding in searching for a desired image, the system control section 50 can display an image according to the flowchart of FIG. 2. It can allow a user to search for a desired image by using thumbnail display screens of FIG. 12A and FIG. 12E. In other words, the digital camera 100 may be arranged not to permit the scrolling display in the direct print setting screen as described with reference to FIG. 3, but it may be arranged to permit the scrolling display also in the direct print setting screen.

As mentioned above, according to the embodiment, the system control section 50 displays the entire original image as a display image, or scrolls a display image with a part of the original image being the display image, depending on relationship between the aspect ratios of the original image and the display area. In addition, the system control section 50 changes whether the entire original image is displayed or the display image is scrolled, depending on a purpose of displaying the image which varies depending on a operational state of the digital camera 100.

That enables an easily viewable display image for a user to be generated depending on a purpose of displaying the image even from the original image with any aspect ratio.

Other Embodiment

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a floppy (registered trademark) disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-284409, filed Sep. 29, 2005, and Japanese Patent Application No. 2006-247761, filed Sep. 13, 2006, which are hereby incorporated by reference herein in their entirety.

What is claimed is:

1. An image pickup apparatus which can display an image on a predetermined display area whose aspect ratio is different from that of said image, comprising:

a first resizing unit adapted to obtain a first resized image by resizing the entirety of said image using a larger magnification out of a first magnification and a second magnification, the first magnification being for matching the size of the entirety of said image in a horizontal direction with the size of said display area in the horizontal direction and the second magnification being for matching the size of the entirety of said image in a vertical direction with the size of said display area in the vertical direction, the vertical direction being a direction different from the horizontal direction;

a second resizing unit adapted to obtain a second resized image by resizing said image using a magnification smaller than the other magnification of said first magnification and said second magnification;

a determination unit adapted to, in accordance with a currently-set display mode for the image pickup apparatus in displaying the image, automatically determine whether (i) to perform scrolling display wherein a partial area, whose size in the first direction matches the size of the display area in the first direction, of the first resized image is displayed on the display area while scrolling the first resized image only in a second direction in which the size of the entirety of the first resized image in the second direction does not match the size of the display area in the second direction, or (ii) to perform full-screen display wherein the entirety of said second resized image being displayed without said first resized image being displayed; and a display control unit adapted to perform said scrolling display or said full-screen display in accordance with the determination by the determination unit, wherein the determination unit performs said automatic determination based on whether or not said currently-set display mode is a REC review display mode for displaying a picked up image immediately after the image is picked up, wherein the determination unit determines to perform said full-screen display, not said scrolling display, if the currently-set display mode is the REC review display mode, and wherein the determination unit determines to perform said scrolling display if the currently-set display mode is a predetermined display mode other than the REC review display mode.

2. An image display method for displaying an image on a predetermined display area of an image pickup apparatus, the predetermined display area having an aspect ratio different from that of said image, the image display method comprising:

a first resizing step of obtaining a first resized image by resizing the entirety of said image using a larger magnification out of a first magnification and a second magnification, the first magnification being for matching the size of the entirety of said image in a horizontal direction with the size of said display area in the horizontal direction and the second magnification being for matching the size of the entirety of said image in a vertical direction with the size of said display area in the vertical direction, the vertical direction being a direction different from the horizontal direction;

a second resizing step of obtaining a second resized image by resizing said image using a magnification smaller than the other magnification of said first magnification and said second magnification;

a determination step of, in accordance with a currently-set display mode for the image pickup apparatus in displaying the image, automatically determining whether (i) to perform scrolling display wherein a partial area, whose size in the first direction matches the size of the display area in the first direction, of the first resized image is displayed on the display area while scrolling the first resized image only in a second direction in which the size of the entirety of the first resized image in the second direction does not match the size of the display area in the second direction, or (ii) to perform full-screen display wherein the entirety of said second resized image being displayed without said first resized image being displayed; and a display control step of performing said scrolling display or said full-screen display in accordance with the determination in the determination step, wherein the determination step performs said automatic determination based on whether or not said currently-set display mode is a REC review display mode for displaying a picked up image immediately after the image is picked up, wherein the determination step determines to perform said full-screen display, not said scrolling display if the currently-set display mode is the REC review display mode, and wherein the determination step determines to perform said scrolling display if the currently-set display mode is a predetermined display mode other than the REC review display mode.

3. A non-transitory computer-readable storage medium storing a computer program for causing a computer to execute an image display method for displaying an image on a predetermined display area of an image pickup apparatus, the predetermined display area having an aspect ratio different from that of said image, the image display method comprising:

a first resizing step of obtaining a first resized image by resizing the entirety of said image using a larger magnification out of a first magnification and a second magnification, the first magnification being for matching the size of the entirety of said image in a horizontal direction with the size of said display area in the horizontal direction and the second magnification being for matching the size of the entirety of said image in a vertical direction with the size of said display area in the vertical direction, the vertical direction being a direction different from the horizontal direction;

a second resizing step of obtaining a second resized image by resizing said image using a magnification smaller than the other magnification of said first magnification and said second magnification;

a determination step of, in accordance with a currently-set display mode for the image pickup apparatus in displaying the image, automatically determining whether (i) to perform scrolling display wherein a partial area, whose size in the first direction matches the size of the display area in the first direction, of the first resized image is displayed on the display area while scrolling the first resized image only in a second direction in which the size of the entirety of the first resized image in the second direction does not match the size of the display area in the second direction, or (ii) to perform full-screen display wherein the entirety of said second resized image being displayed without said first resized image being displayed; and a display control step of [performina] *performing* said scrolling display or said full-screen display in accordance with the determination in the determination step, wherein the determination step performs said automatic determination based on whether or not said currently-set display mode is a REC review display mode for displaying a picked up image immediately after the image is picked up, wherein the determination step determines to perform said full-screen display, not said scrolling display, if the currently-set display mode is the REC review display mode, and wherein the determination step determines to perform said scrolling display if the currently-set display mode is a predetermined display mode other than the REC review display mode.

4. An image display control apparatus for displaying an image on a predetermined display area whose aspect ratio is different from that of said image, comprising:

a first resizing unit adapted to obtain a first resized image by resizing the entirety of said image using a larger magnification out of a first magnification and a second magnification, the first magnification being for matching the size of the entirety of said image in a horizontal direction with the size of said display area in the horizontal direction and the second magnification being for matching the size of the entirety of said image in a vertical direction with the size of said display area in the vertical direction, the vertical direction being a direction different from the horizontal direction;

a second resizing unit adapted to obtain a second resized image by resizing said image using a magnification smaller than the other magnification of said first magnification and said second magnification;

a determination unit adapted to, in accordance with a currently-set display mode for the image display control apparatus in displaying the image, automatically determine whether (i) to perform scrolling display wherein a partial area, whose size in the first direction matches the size of the display area in the first direction, of the first resized image is displayed on the display area while scrolling the first resized image only in a second direction in which the size of the entirety of the first resized image in the second direction does not match the size of the display area in the second direction, or (ii) to perform full-screen display wherein the entirety of said second resized image being displayed without said first resized image being displayed; and a display control unit adapted to perform said scrolling display or said full-screen display in accordance with the determination by the determination unit;

wherein the determination unit performs said automatic determination based on whether or not said currently-set display mode is a slide show display mode for automatic serial display of images, wherein the determination unit determines to perform said full-screen display, not said scrolling display, if the currently-set display mode is the slide show display mode and a display time set as a time for displaying respective one of images in the slide show display mode is within a predetermined time, and wherein the determination unit determines to perform said scrolling display if the currently-set display mode is the slide show display mode and said display time is longer than the predetermined time.

5. The image display control apparatus according to claim 4, wherein the display control unit stops said scrolling display if an instruction is made by a user to switch to a next image when said scrolling display is being performed in the slide show display mode.

6. The image display control apparatus according to claim 4, further comprising an image pickup unit for picking up an image, wherein:

the determination unit determines to perform said full-screen display, not said scrolling display, if the currently-set display mode is the REC review display mode; and the determination unit determines to perform said full-screen display, not said scrolling display, if the currently-set display mode is the slide show display mode.

7. The image display control apparatus according to claim 6 further comprising a recording unit adapted to record information indicating that said image has once undergone the scrolling display in a case that the display control unit performs the scrolling display on said image, wherein based on the information recorded by the recording unit, if an image to be displayed has once undergone the scrolling display, said determination unit determines to perform the full-screen display irrespective of the currently-set display mode.

8. An image display method for displaying an image on a predetermined display area of an image display control apparatus, the predetermined display area having an aspect ratio different from that of said image, the image display method comprising:

a first resizing step of obtaining a first resized image by resizing the entirety of said image using a larger magnification out of a first magnification and a second magnification, the first magnification being for matching the size of the entirety of said image in a horizontal direction with the size of said display area in the horizontal direction and the second magnification being for matching the size of the entirety of said image in a vertical direction with the size of said display area in the vertical direction, the vertical direction being a direction different from the horizontal direction;

a second resizing step of obtaining a second resized image by resizing said image using a magnification smaller than the other magnification of said first magnification and said second magnification;

a determination step of, in accordance with a currently-set display mode for the image display control apparatus in displaying the image, automatically determining whether (i) to perform scrolling display wherein a partial area, whose size in the first direction matches the size of the display area in the first direction, of the first resized image is displayed on the display area while scrolling the first resized image only in a second direction in which the size of the entirety of the first resized image in the second direction does not match the size of the display area in the second direction, or (ii) to perform full-screen display wherein the entirety of said second resized image being displayed without said first resized image being displayed; and a display control step of performing said scrolling display or said full-screen display in accordance with the determination in the determination step, wherein the determination step performs said automatic determination based on whether or not said currently-set display mode is a slide show display mode for automatic serial display of images, wherein the determination step determines to perform said full-screen display, not said scrolling display, if the currently-set display mode is the slide show display mode and a display time set as a time for displaying respective one of images in the slide show display mode is within a predetermined time, and wherein the determination step determines to perform said scrolling display if the currently-set display mode is the slide show display mode and said display time is longer than the predetermined time.

9. A non-transitory computer-readable storage medium storing a computer program for causing a computer to execute an image display method for displaying an image on a predetermined display area of an image display control apparatus, the predetermined display area having an aspect ratio different from that of said image, the image display method comprising:

a first resizing step of obtaining a first resized image by resizing the entirety of said image using a larger magnification out of a first magnification and a second magnification, the first magnification being for matching the size of the entirety of said image in a horizontal direction with the size of said display area in the horizontal direction and the second magnification being for matching the size of the entirety of said image in a vertical direction with the size of said display area in the vertical direction, the vertical direction being a direction different from the horizontal direction;

a second resizing step of obtaining a second resized image by resizing said image using a magnification smaller than the other magnification of said first magnification and said second magnification;

a determination step of, in accordance with a currently-set display mode for the image display control apparatus in displaying the image, automatically determining whether (i) to perform scrolling display wherein a partial area, whose size in the first direction matches the size of the display area in the first direction, of the first resized image is displayed on the display area while scrolling the first resized image only in a second direction in which the size of the entirety of the first resized image in the second direction does not match the size of the display area in the second direction, or (ii) to perform full-screen display wherein the entirety of said second resized image being displayed without said first resized image being displayed; and a display control step of performing said scrolling display or said full-screen display in accordance with the determination in the determination step, wherein the determination step performs said automatic determination based on whether or not said currently-set display mode is a slide show display mode for automatic serial display of images, wherein the determination step determines to perform said full-screen display, not said scrolling display, if the currently-set display mode is the slide show display mode and a display time set as a time for displaying respective one of images in the slide show display mode is within a predetermined time, and wherein the determination step determines to perform said scrolling display if the currently-set display mode is the slide show display mode and said display time is longer than the predetermined time.

10. An image pickup apparatus which can display an image on a predetermined display area whose aspect ratio is different from that of said image, comprising:

a first resizing unit adapted to obtain a first resized image by resizing the entirety of said image using a larger magnification out of a first magnification and a second magnification, the first magnification being for matching the size of the entirety of said image in a horizontal direction with the size of said display area in the horizontal direction and the second magnification being for matching the size of the entirety of said image in a vertical direction with the size of said display area in the vertical direction, the vertical direction being a direction different from the horizontal direction;

a second resizing unit adapted to obtain a second resized image by resizing said image using a magnification smaller than the other magnification of said first magnification and said second magnification;

a determination unit adapted to, in accordance with a currently-set display mode for the image pickup apparatus in displaying the image, automatically determine whether (i) to perform scrolling display wherein [apartial] *a partial* area, whose size in the first direction matches the size of the display area in the first direction, of the first resized image is displayed on the display area while scrolling the first resized image only in a second direction in which the size of the entirety of the first resized image in the second direction does not match the size of the display area in the second direction, or (ii) to perform full-screen display wherein the entirety of said second resized image being displayed without said first resized image being displayed; and a display control unit adapted to perform said scrolling display or said full-screen display in accordance with the determination by the determination unit, wherein the determination unit performs said automatic determination based on whether or not said currently-set display mode is a REC review display mode for displaying a picked up image immediately after the image is picked up, wherein the determination unit determines to perform said full-screen display, not said scrolling display, if the currently-set display mode is the REC review display mode and a display time set as a time for displaying an image in the REC review display mode is within a predetermined time, and wherein the determination unit determines to perform said scrolling display if the currently-set display mode is the REC review display mode and said display time is longer than the predetermined time.

11. The image pickup apparatus according to claim 10, wherein:

the display control unit stops said scrolling display if an image pickup instruction is made by a user when said scrolling display is being performed in the REC review display mode.

12. An image display method for displaying an image on a predetermined display area of an image pickup apparatus, the predetermined display area having an aspect ratio different from that of said image, the image display method comprising:

a first resizing step of obtaining a first resized image by resizing the entirety of said image using a larger magnification out of a first magnification and a second magnification, the first magnification being for matching the size of the entirety of said image in a horizontal direction with the size of said display area in the horizontal direction and the second magnification being for matching the size of the entirety of said image in a vertical direction with the size of said display area in the vertical direction, the vertical direction being a direction different from the horizontal direction;

a second resizing step of obtaining a second resized image by resizing said image using a magnification smaller than the other magnification of said first magnification and said second magnification;

a determination step of, in accordance with a currently-set display mode for the image pickup apparatus in displaying the image, automatically determining whether (i) to perform scrolling display wherein a partial area, whose size in the first direction matches the size of the display area in the first direction, of the first resized image is displayed on the display area while scrolling the first resized image only in a second direction in which the size of the entirety of the first resized image in the second direction does not match the size of the display area in the second direction, or (ii) to perform full-screen display wherein the entirety of said second resized image being displayed without said first resized image being displayed; and a display control step of performing said scrolling display or said full-screen display in accordance with the determination in the determination step, wherein the determination step performs said automatic determination based on whether or not said currently-set display mode is a REC review display mode for displaying a picked up image immediately after the image is picked up, wherein the determination step determines to perform said full-screen display, not said scrolling display, if the currently-set display mode is the REC review display mode and a display time set as a time for displaying an image in the REC review display mode is within a predetermined time, and wherein the determination step determines to perform said scrolling display if the currently-set display mode is the REC review display mode and said display time is longer than the predetermined time.

13. A non-transitory computer-readable storage medium storing a computer program for causing a computer to execute an image display method for displaying an image on a predetermined display area of an image pickup apparatus, the predetermined display area having an aspect ratio different from that of said image, the image display method comprising:

a first resizing step of obtaining a first resized image by resizing the entirety of said image using a larger magnification out of a first magnification and a second magnification, the first magnification being for matching the size of the entirety of said image in a horizontal direction with the size of said display area in the horizontal direction and the second magnification being for matching the size of the entirety of said image in a vertical direction with the size of said display area in the vertical direction, the vertical direction being a direction different from the horizontal direction;

a second resizing step of obtaining a second resized image by resizing said image using a magnification smaller than the other magnification of said first magnification and said second magnification;

a determination step of, in accordance with a currently-set display mode for the image pickup apparatus in displaying the image, automatically determining whether (i) to perform scrolling display wherein a partial area, whose size in the first direction matches the size of the display area in the first direction, of the first resized image is displayed on the display area while scrolling the first resized image only in a second direction in which the size of the entirety of the first resized image in the second direction does not match the size of the display area in the second direction, or (ii) to perform full-screen display wherein the entirety of said second resized image being displayed without said first resized image being displayed; and a display control step of performing said scrolling display or said full-screen display in accordance with the determination in the determination step, wherein the determination step performs said automatic determination based on whether or not said currently-set display mode is a REC review display mode for displaying a picked up image immediately after the image is picked up, wherein the determination step determines to perform said full-screen display, not said scrolling display, if the currently-set display mode is the REC review display mode and a display time set as a time for displaying an image in the REC review display mode is within a predetermined time, and wherein the determination step determines to perform said scrolling display if the currently-set display mode is the REC review display mode and said display time is longer than the predetermined time.

14. An image display control apparatus for displaying an image on a predetermined display area whose aspect ratio is different from that of said image, comprising:

a first resizing unit adapted to obtain a first resized image by resizing the entirety of said image using a larger magnification out of a first magnification and a second magnification, the first magnification being for matching the size of the entirety of said image in a horizontal direction with the size of said display area in the horizontal direction and the second magnification being for matching the size of the entirety of said image in a vertical direction with the size of said display area in the vertical direction, the vertical direction being a direction different from the horizontal direction;

a second resizing unit adapted to obtain a second resized image by resizing said image using a magnification smaller than the other magnification of said first magnification and said second magnification;

a determination unit adapted to, in accordance with a currently-set display mode for the image display control apparatus in displaying the image automatically determine whether (i) to perform scrolling display wherein a partial area, whose size in the first direction matches the size of the display area in the first direction, of the first resized image is displayed on the display area while scrolling the first resized image only in a second direction in which the size of the entirety of the first resized image in the second direction does not match the size of the display area in the second direction, or (ii) to perform full-screen display wherein the entirety of said second resized image being displayed without said first resized image being displayed; and a display control unit adapted to perform said scrolling display or said full-screen display in accordance with the determination by the determination unit, wherein the determination unit performs said automatic determination based on whether or not said currently-set display mode is a slide show display mode for automatic serial display of images, wherein the determination unit determines to perform said full-screen display, not said scrolling display, if the currently-set display mode is the slide show display mode and an effect setting is performed on the slide show, and wherein the determination unit determines to perform said scrolling display if the currently-set display mode is the slide show display mode and an effect setting is not performed on the slide show.

15. An image display method for displaying an image on a predetermined display area of an image display control apparatus, the predetermined display area having an aspect ratio different from that of said image, the image display method comprising:

a first resizing step of obtaining a first resized image by resizing the entirety of said image using a larger magnification out of a first magnification and a second magnification, the first magnification being for matching the size of the entirety of said image in a horizontal direction with the size of said display area in the horizontal direction and the second magnification being for matching the size of the entirety of said image in a vertical direction with the size of said display area in the vertical direction, the vertical direction being a direction different from the horizontal direction;

a second resizing step of obtaining a second resized image by resizing said image using a magnification smaller than the other magnification of said first magnification and said second magnification;

a determination step of, in accordance with a currently-set display mode for the image display control apparatus in displaying the image, automatically determining whether (i) to perform scrolling display wherein a partial area, whose size in the first direction matches the size of the display area in the first direction, of the first resized image is displayed on the display area while scrolling the first resized image only in a second direction in which the size of the entirety of the first resized image in the second direction does not match the size of the display area in the second direction, or (ii) to perform full-screen display wherein the entirety of said second resized image being displayed without said first resized image being displayed; and a display control step of performing said scrolling display or said full-screen display in accordance with the determination in the determination step, wherein the determination step performs said automatic determination based on whether or not said currently-set display mode is a slide show display mode for automatic serial display of images, wherein the determination step determines to perform said full-screen display, not said scrolling display, if the currently-set display mode is the slide show display mode and an effect setting is performed on the slide show, and wherein the determination step determines to perform said scrolling display if the currently-set display mode is the slide show display mode and an effect setting is not performed on the slide show.

16. A non-transitory computer-readable storage medium storing a computer program for causing a computer to execute an image display method for displaying an image on a predetermined display area of an image display control apparatus, the predetermined display area having an aspect ratio different from that of said image, the image display method comprising:

a first resizing step of obtaining a first resized image by resizing the entirety of said image using a larger magnification out of a first magnification and a second magnification, the first magnification being for matching the size of the entirety of said image in a horizontal direction with the size of said display area in the horizontal direction and the second magnification being for matching the size of the entirety of said image in a vertical direction with the size of said display area in the vertical direction, the vertical direction being a direction different from the horizontal direction;

a second resizing step of obtaining a second resized image by resizing said image using a magnification smaller than the other magnification of said first magnification and said second magnification;

a determination step of, in accordance with a currently-set display mode for the image display control apparatus in displaying the image, automatically determining whether (i) to perform scrolling display wherein a partial area, whose size in the first direction matches the size of the display area in the first direction, of the first resized image is displayed on the display area while scrolling the first resized image only in a second direction in which the size of the entirety of the first resized image in the second direction does not match the size of the display area in the second direction, or (ii) to perform full-screen display wherein the entirety of said second resized image being displayed without said first resized image being displayed; and a display control step of performing said scrolling display or said full-screen display in accordance with the determination in the determination step, wherein the determination step performs said automatic determination based on whether or not said currently-set display mode is a slide show display mode for automatic serial display of images, wherein the determination step determines to perform said full-screen display, not said scrolling display, if the currently-set display mode is the slide show display mode and an effect setting is performed on the slide show, and wherein the determination step determines to perform said scrolling display if the currently-set display mode is the slide show display mode and an effect setting is not performed on the slide show.

*17. An image display control apparatus for displaying an image, comprising:*

*a display control unit adapted to perform control to resize an image and display it on a display unit in one of a plurality of display modes including a multi-display mode in which a plurality of images are displayed on one screen, wherein the display control unit is capable of displaying the image regardless of whether the image is in a landscape orientation or in a portrait orientation; and*

*a control unit adapted to control the display control unit to automatically display the image using a larger magnification out of a first magnification and a second magnification depending on whether a currently-set display mode is the multi-display mode without a user instruction on whether to use the first magnification or the second magnification, the first magnification being for matching the size of the entirety of said image in a horizontal direction with the size of a display area of said display unit in the horizontal direction and the second magnification being for matching the size of the entirety of said image in a vertical direction with the size of said display area in the vertical direction.*

*18. The image display control apparatus according to claim 17, wherein*

*the control unit controls the display control unit so that the display control unit displays the image using one of said larger magnification and a smaller magnification out of the first magnification and the second magnification if the currently-set display mode is said multi-display mode and the display control unit displays the image using another one of said larger magnification and said smaller magnification if the currently-set display mode is a single-display mode in which a single image is displayed on one screen.*

*19. The image display control apparatus according to claim 17, wherein*

*the control unit controls the display control unit so that the display control unit displays the image using a smaller magnification out of the first magnification and the second magnification if the currently-set display mode is the multi-display mode.*

*20. The image display control apparatus according to claim 17, wherein*

*the display control unit displays a part of the image by excluding another part of the image which does not fit in the display area when the display control unit displays the image using said larger magnification.*

*21. The image display control apparatus according to claim 20, wherein*

*the display control unit is capable of displaying said another part of the image which does not fit in the display area by scrolling the image when the display control unit displays the image using said larger magnification.*

*22. The image display control apparatus according to claim 17, further comprising an image pickup unit for picking up an image.*

*23. An image display control method for displaying an image, comprising:*

*a display control step of performing control to resize an image and display it on a display unit in one of a plurality of display modes including a multi-display mode in which a plurality of images are displayed on one screen, wherein the display control step is capable of displaying the image regardless of whether the image is in a landscape orientation or in a portrait orientation; and*

*a control step of controlling the display control step automatically display the image using a larger magnification out of a first magnification and a second magnification or using a smaller magnification depending on whether a currently-set display mode is the multi-display mode without a user instruction on whether to use the first magnification or the second magnification, the first magnification being for matching the size of the entirety of said image in a horizontal direction with the size of a display area of said display unit in the horizontal direction and the second magnification being for matching the size of the entirety of said image in a vertical direction with the size of said display area in the vertical direction.*

*24. A non-transitory computer-readable storage medium storing a computer program for causing a computer to execute an image display control method for displaying an image, the image display control method comprising:*

*a display control step of performing control to resize an image and display it on a display unit in one of a plurality of display modes including a multi-display mode in which a plurality of images are displayed on one screen, wherein the display control step is capable of*

*displaying the image regardless of whether the image is in a landscape orientation or in a portrait orientation; and*

*a control step of controlling the display control step to automatically display the image using a larger magnification out of a first magnification and a second magnification depending on whether a currently-set display mode is the multi-display mode without a user instruction on whether to use the first magnification or the second magnification, the first magnification being for matching the size of the entirety of said image in a horizontal direction with the size of a display area of said display unit in the horizontal direction and the second magnification being for matching the size of the entirety of said image in a vertical direction with the size of said display area in the vertical direction.*

*25. An image display control apparatus for displaying an image, comprising:*

*a display control unit adapted to perform control to resize an image and display it on a display unit in one of a plurality of display modes including a multi-display mode in which a plurality of images are displayed on one screen, wherein the display control unit is capable of displaying the image regardless of whether the image is in a landscape orientation or in a portrait orientation; and*

*a control unit adapted to control the display control unit to automatically display the image using a larger magnification by which not an entirety but a part of the image is displayed not a smaller magnification by which the entirety of the image is displayed depending on whether a currently-set display mode is the multi-display mode without a user instruction on whether to use the larger magnification or the smaller magnification.*

*26. An image display control method for displaying an image, comprising:*

*a display control step of performing control to resize an image and display it on a display unit in one of a plurality of display modes including a multi-display mode in which a plurality of images are displayed on one screen, wherein the display control step is capable of displaying the image regardless of whether the image is in a landscape orientation or in a portrait orientation; and*

*a control step of controlling the display control step to automatically display the image using a larger magnification by which not an entirety but a part of the image is displayed not a smaller magnification by which the entirety of the image is displayed depending on whether a currently-set display mode is the multi-display mode without a user instruction on whether to use the larger magnification or the smaller magnification.*

*27. A non-transitory computer-readable storage medium storing a computer program for causing a computer to execute an image display control method for displaying an image, the image display control method comprising:*

*a display control step of performing control to resize an image and display it on a display unit in one of a plurality of display modes including a multi-display mode in which a plurality of images are displayed on one screen, wherein the display control step is capable of displaying the image regardless of whether the image is in a landscape orientation or in a portrait orientation; and*

*a control step of controlling the display control step to automatically display the image using a larger magnification by which not an entirety but a part of the image is displayed not a smaller magnification by which the entirety of the image is displayed depending on whether a currently-set display mode is the multi-display mode without requiring a user instruction on whether to use the larger magnification or the smaller magnification.*

* * * * *